United States Patent
Popowitz et al.

(10) Patent No.: US 10,498,847 B2
(45) Date of Patent: Dec. 3, 2019

(54) SYSTEM AND METHOD FOR MOBILE APPLICATION DEEP LINKING

(71) Applicant: Go Daddy Operating Company, LLC, Scottsdale, AZ (US)

(72) Inventors: David Popowitz, Woodside, CA (US); Marek Olszewski, San Francisco, CA (US); Moninder Jheeta, Fremont, CA (US); Nitin Gupta, Mountain View, CA (US); Rene Reinsberg, San Francisco, CA (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 150 days.

(21) Appl. No.: 15/041,605

(22) Filed: Feb. 11, 2016

(65) Prior Publication Data
US 2016/0234330 A1    Aug. 11, 2016

Related U.S. Application Data

(60) Provisional application No. 62/114,986, filed on Feb. 11, 2015.

(51) Int. Cl.
*H04L 29/08* (2006.01)
*H04L 29/12* (2006.01)
*G06F 16/955* (2019.01)

(52) U.S. Cl.
CPC ...... *H04L 67/2814* (2013.01); *G06F 16/9566* (2019.01); *H04L 61/1511* (2013.01); *H04L 67/2823* (2013.01); *H04L 67/02* (2013.01)

(58) Field of Classification Search
CPC ....... H04W 4/003; H04L 67/42; H04L 67/125
See application file for complete search history.

(56) References Cited

U.S. PATENT DOCUMENTS

| | | | |
|---|---|---|---|
| 6,839,760 B1 * | 1/2005 | Walters | G06F 16/9566 709/229 |
| 8,209,615 B2 * | 6/2012 | Gupta | G06F 9/4843 715/205 |
| 8,799,262 B2 * | 8/2014 | Paduroiu | G06Q 30/0201 707/710 |
| 9,594,477 B1 * | 3/2017 | Ardakani | G06F 16/957 |
| 9,608,870 B1 * | 3/2017 | Hendriks | H04L 41/22 |
| 9,633,378 B1 * | 4/2017 | Nath | G06Q 30/0277 |
| 9,779,425 B2 * | 10/2017 | Stoliartchouk | G06Q 30/0277 |
| 9,806,942 B2 * | 10/2017 | Saxena | H04W 4/003 |
| 10,042,933 B2 * | 8/2018 | Johl | G06F 16/951 |
| 10,068,028 B1 * | 9/2018 | Hendriks | H04L 41/22 |
| 10,152,734 B1 * | 12/2018 | Nath | G06Q 30/0277 |

(Continued)

*Primary Examiner* — Jimmy H Tran
(74) *Attorney, Agent, or Firm* — Greenberg Traurig, LLP (57) ABSTRACT

A system and method for application deep linking is presented. The system includes a proxy server configured to receive a request for a first web page of a website. The proxy server retrieves content of the first web page and modifies the content to include a uniform resource indicator to create a modified content of the first web page. The uniform resource indicator includes the deep link setting and, when executed by a computing device, the uniform resource indicator causes the computing device to load an application identified by the uniform resource indicator. The proxy server is configured to transmit the modified content of the first web page to a requesting computing device.

8 Claims, 4 Drawing Sheets

(56) References Cited

U.S. PATENT DOCUMENTS

| | | | |
|---|---|---|---|
| 2004/0181585 A1* | 9/2004 | Atkinson | G06Q 10/107 709/206 |
| 2004/0254960 A1* | 12/2004 | Scaturro | H04L 29/06027 |
| 2007/0011340 A1* | 1/2007 | Seidl | G06F 16/958 709/228 |
| 2008/0134049 A1* | 6/2008 | Gupta | G06F 9/4843 715/738 |
| 2008/0147655 A1* | 6/2008 | Sinha | G06F 16/288 |
| 2009/0293018 A1* | 11/2009 | Wilson | G06F 16/951 715/811 |
| 2010/0058160 A1* | 3/2010 | Navarro | G06Q 10/0637 715/208 |
| 2012/0173742 A1* | 7/2012 | Noldus | H04L 29/12132 709/228 |
| 2013/0018680 A1* | 1/2013 | Stephens | G06Q 10/02 705/5 |
| 2013/0121298 A1* | 5/2013 | Rune | H04L 29/12066 370/329 |
| 2014/0012750 A1* | 1/2014 | Kuhn | G06Q 20/36 705/41 |
| 2014/0019266 A1* | 1/2014 | Stoliartchouk | G06Q 30/0277 705/14.73 |
| 2014/0108373 A1* | 4/2014 | Abrahami | G06F 17/2247 707/706 |
| 2014/0214916 A1* | 7/2014 | Gokul | G06Q 30/02 709/201 |
| 2015/0143211 A1* | 5/2015 | Kaufthal | G06F 17/2235 715/205 |
| 2015/0154644 A1* | 6/2015 | Saxena | G06Q 30/0269 705/14.66 |
| 2015/0156061 A1* | 6/2015 | Saxena | H04W 4/003 715/733 |
| 2016/0098408 A1* | 4/2016 | Imaizumi | G06F 16/24578 707/723 |
| 2016/0142858 A1* | 5/2016 | Molinet | H04W 4/003 709/203 |
| 2016/0196579 A1* | 7/2016 | Koura | G06Q 30/0255 705/14.53 |
| 2016/0379298 A1* | 12/2016 | Isaacson | G06Q 20/12 705/26.62 |
| 2017/0004209 A1* | 1/2017 | Johl | G06F 16/951 |
| 2017/0228797 A1* | 8/2017 | Nath | G06Q 30/0277 |
| 2017/0256003 A1* | 9/2017 | Isaacson | G07G 1/0009 |

\* cited by examiner

SYSTEM AND METHOD FOR MOBILE APPLICATION DEEP LINKING

CROSS-REFERENCE TO RELATED APPLICATIONS

This application claims priority to U.S. Provisional Patent Application 62/114,986 filed on Feb. 11, 2015 and entitled "SYSTEM AND METHOD FOR MOBILE APPLICATION DEEP LINKING."

FIELD OF THE INVENTION

The present invention generally relates to website design and communication, and, more specifically, to systems and methods for mobile application deep linking into website content.

BACKGROUND OF THE INVENTION

The information on web pages is in the form of programmed source code that a browser interprets to determine what to display on a requesting device. The source code may include document formats, objects, parameters, positioning instructions, and other code that is defined in one or more web programming or markup languages. One web programming language is HyperText Markup Language ("HTML"), and all web pages may use it to some extent. HTML uses text indicators called tags to provide interpretation instructions to the browser. The tags specify the composition of design elements such as text, images, shapes, hyperlinks to other web pages, programming objects such as JAVA applets and JavaScript resource calls, form fields, tables, and other elements. The web page can be formatted for proper display on computer systems with widely varying display parameters, due to differences in screen size, resolution, processing power, and maximum download speeds.

DETAILED DESCRIPTION OF THE PREFERRED EMBODIMENT

The present invention generally relates to website design and communication, and, more specifically, to systems and methods for mobile application deep linking into website content.

The World Wide Web (WWW) resembles a large ecosystem with a very large number of web pages interconnected by trillions of links. In addition to the WWW, another ecosystem is emerging in the form of mobile applications. Recently, the amount of time spent using or browsing mobile applications by users has overtaken time spent on the WWW. And with that milestone, there is a need to revisit the experience delivered by siloed mobile applications.

Any web page can link to any other web page, by pointing to the web page's Uniform Resource Locator (URL). Mobile applications, however, aren't built on the same HTTP protocol as web pages, and therefore navigation between application pages does not have the same easy standard provided to websites. Instead, mobile applications navigate within themselves via screens and states. Linking across applications has typically been limited to either calls to download an application, or landing on the home screen of a previously installed app.

In the web world, these experiences would be the equivalent of always landing on a company's homepage, no matter what you were trying to do within those sites. Applications have historically been limited by a lack of flexibility, and in the best cases, an application may link to a relevant page on the WWW in a hybrid web view.

Deep links are a way to connect otherwise disparate applications and their experiences. Deep linking enables a first mobile application to link into another application to make specific content more accessible. An example of this would be for a first mobile application (e.g., a mapping application) including a link that, once activated, opens a particular page or state on a second application (e.g., a business review in a business review application or a particular home listing on a real estate mobile application). A second type of deep linking enables a first mobile application to use the deep link to pass data into a second mobile application to contextualize or customize an experience for a user. For example, a link may open a ticket purchase mobile application directly to events for tonight.

Deep linking is supported by major mobile development platforms using low level programming mechanisms that application writers can utilize. Common to each platform is the concept of registering a deep link uniform resource identifier (URI) that when invoked, opens a particular application in a desired state (e.g. a particular application screen). Deep link URIs differ from traditional webpage URLs in that they are not associated with resources accessible online, but rather specific application states that may or may not require accessing remote online resources. Additionally, unlike webpage URLs, deep link URIs can specify their own scheme (the part of the URI before the :// in the URI). For example, YELP uses the 'yelp' scheme to register deep links for its iOS mobile app. The following deep link will open a popular sandwich shop business profile in the YELP iOS app, for example:

yelp:///biz/the-restaurant-san-francisco

At a relatively high level, mobile application developers can register their deep link URIs by first specifying their preferred deep link scheme in a configuration file when compiling the mobile application. They can then implement support for receiving links by updating the main entry points to their application with code that checks for the presence of a passed-in URI, and updates the state of the application accordingly.

When choosing a scheme for use with an application, it is important that the application developer chooses a unique string to avoid conflicts with other applications. Such conflicts can lead to undefined behavior. For this reason, an application's brand name or an associated domain name written out in reverse (e.g. com.godaddy.com) is sometimes used as the application's name.

Application developers that want to link their applications to other applications do so through a series of steps. They must first check that the targeted application is installed, and if so launch that application using the desired deep link URI. If the target application is not installed, it is up to the developer to decide what action to perform. In some cases it may be desirable to open a web page or application store enabling the user to download the application, or to simply fall back gracefully to an equivalent mobile webpage if one is available.

Because many mobile applications have matching mobile-optimized websites, it can often be desirable to associate specific web pages with equivalent deep links (application states) so that users wishing to view a mobile web page can instead be brought to a native mobile application if they have they application installed for a better experience. Since web pages URLs can be harder to spoof than deep link URIs, associating them with deep link URIs adds an element of trust that is rapidly making using such 'associated web pages' a preferred way of deep linking. In this approach, the deep link URIs may be referred to as web-associated deep link URIs.

A developer can choose to insert a link tag of the following format into the associated web page that references the deep link, thereby connecting the web page with the deep link:

<link rel="alternate" href="android-app://com.example/http/example.com/path">

Alternatively, the developer may embed a snippet of JSON-LD of the schema.org 'Action' type into the web page or annotate each of the website's web pages in the site's sitemap.xml file. From that point on, by crawling the web pages, a WWW search engine can associate the specified deep link URIs with the web pages and use them in lieu of the web pages whenever it improves the user experience. This strategy also adds an element of trust to the referenced deep links as they are now associated with a domain name. By using this markup approach, application developers can make it relatively easy for third parties to link to their deep links.

Using this approach, rather than third parties being required to check whether the target application is installed and implement a graceful degradation strategy when the application is not installed, the third parties may simply have to point the mobile device to the associated web page URL which will seamlessly be forwarded by the device's operating system to the target application, if the target application has been installed. If the target application has not been installed, the mobile device may instead simply display the target web page in a suitable web browser.

Currently, many companies have proposed their own web-associating standards. For example, TWITTER asks that web page developers embed a series of meta tags on their web pages that reference the associated mobile application. For example, the following markup may associate a web page with deep links to applications on various mobile platforms:

<meta name="twitter:app:name:iphone" content="Cannonball">
<meta name="twitter:app:id:iphone" content="929750075">
<meta name="twitter:app:url:iphone" content="cannonball://poem/5149e249222f9e600a7540ef">
<meta name="twitter:app:name:googleplay" content="Cannonball">
<meta name="twitter:app:id:googleplay" content="io.fabric.samples.cannonball">
<meta name="twitter:app:url:googleplay" content="http://cannonball.fabric.io/poem/5149e249222f9e600a7540ef">

When the TWITTER crawler sees such content when examining a shared link, the crawler learns that the link can be opened by the corresponding deep links for each platform. The crawler records this information as part of the originating tweet so that the TWITTER application can open the deep link directly, without first opening a browser, when the user clicks through the shared item. If the required application is not installed, the TWITTER application can optionally drive application downloads by presenting a link that takes the user to app page on the current platform's application store.

Another alternative approach for deep link web-associating uses meta tags on web pages to associate the web pages with deep link URIs into mobile applications on multiple platforms as illustrated in the following example:

<meta property="al:ios:url" content="applinks://docs"/>
<meta property="al:ios:app_store_id" content="12345"/>
<meta property="allos:app_name" content="App Links"/>
<meta property="al:android:url" content="applinks://docs"/>
<meta property="al:android:app_name" content="App Links"/>
<meta property="al:android:package" content="org.applinks"/>

These links, once installed into a web page can be crawled by social networks, for example, to identify available deep links that can then be opened directly into the identified mobile application for content shared on the social network.

When crawling the web page content to identify the deep links encoded therein, the crawler can execute instructions to determine whether a particular deep link's target application is installed. If the application is not installed, the system can then degrade gracefully (e.g., by sending a user to a web page when the target application is not installed) based on rules that can also be specified on the target webpage using more meta tags (simplifying deep link integrations for the adopting application developer).

Each of these approaches may require that a browser or application choosing to open associated deep links must first load and parse the web page containing the linking markup. Doing so on a mobile network can be needlessly slow if the webpage is large or slow to respond. In order to reduce overhead on the mobile device, therefore, some companies crawl web pages asynchronously from their data centers and cache the results. This is not always feasible for smaller application developers.

As a result, some companies with deep linking standards have started to provide link resolution services. These services do the work of parsing through the web pages that have meta data setting forth deep links, allowing application developers to simply makes a request to the resolver instead of the linked webpage. For example, one service allows easy querying of deep links by inputting a web page URL in the following format: http://urx.io/example.com/path. This will return a JSON response that includes the platform specific deep link needed to redirect the user to a correct deep-linked application.

Although useful, the complexities associated with application deep linking described herein can make it difficult for website owners and website developers to incorporate deep linking URI strategies into their websites. Generally, website developers and other professionals would prefer to focus on building compelling websites and mobile applications without juggling multiple competing deep link web-associating standards to add support for both linking out to third party deep link targets, and for making it easier for others to link directly to their applications. It can be increasingly difficult for a developer to incorporate a deep linking strategy into a website that was constructed, for example, using a development platform that does not allow for the straightforward installation of web-associated deep link URIs into the pages of the website. In those cases, using conventional approaches, it may be impossible to insert deep links into the website allowing pages of the website to be associated with pages or states of a particular mobile application.

To mitigate these difficulties, the present system is arranged to provide a gateway engine that can be configured to automatically insert web-associated deep link URIs into a website. In one implementation, the system operates by updating the DNS entry of a website's domain to insert a reverse-proxy into the request path for all requests made to the website. Once inserted into the request path, the gateway device (e.g., a proxy server) can then dynamically update the HTML returned by the site's web server before the content is viewed by or transmitted to the end user fetching or requesting the web page. The gateway device can then automatically insert code for a number of popular deep link web-associating standards automatically into the target web pages. Because the code is inserted using the gateway, the code can be added regardless of where the website is hosted, even if the website is hosted on a closed-down platform that prevents the insertion of arbitrary HTML code into the website.

Settings to control how the deep links are inserted into the website can be managed by a user settings page hosted by the same or different entity that implements the gateway device.

Figure 1:
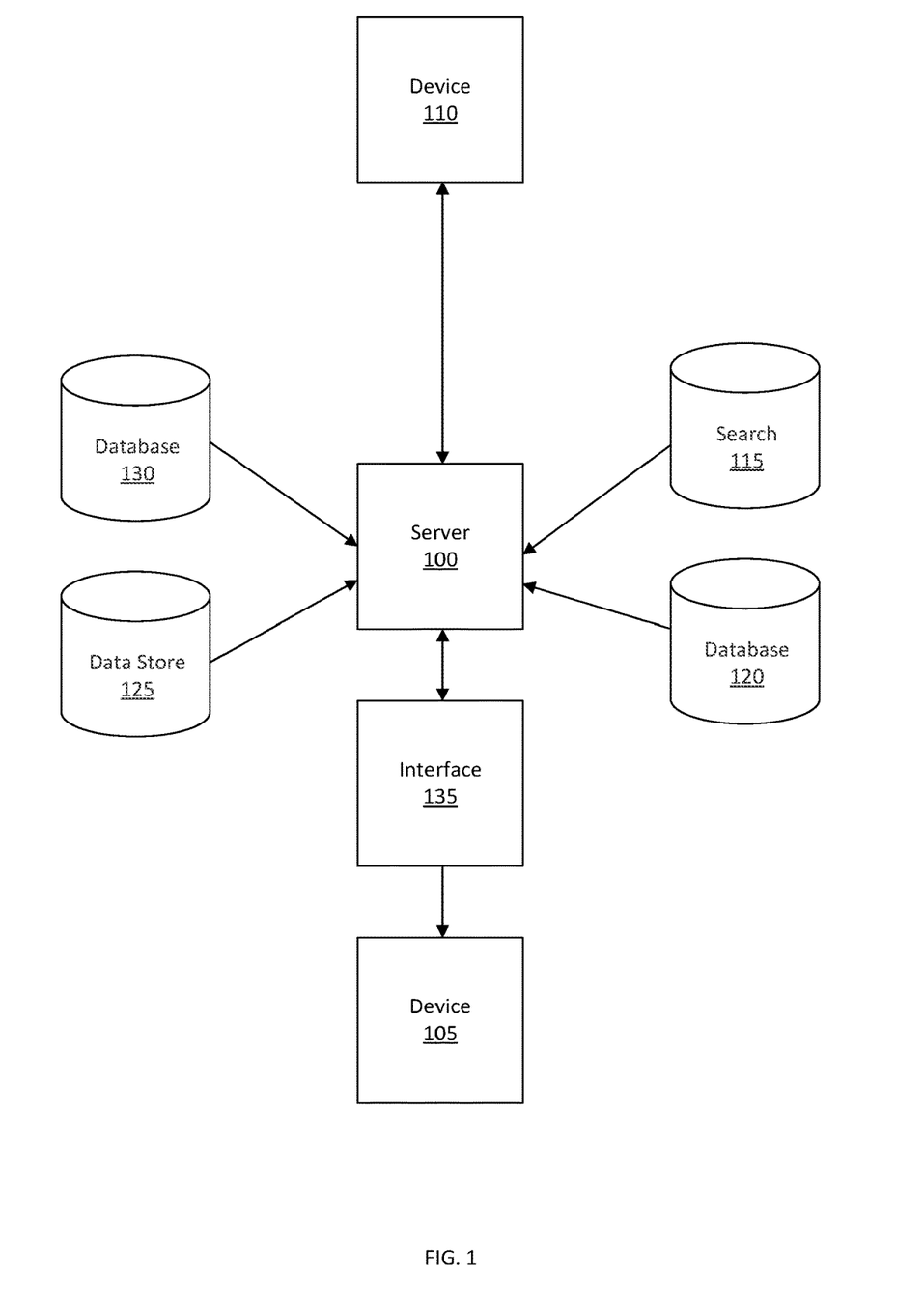
FIG. 1 illustrates a typical web server and client arrangement with a client requesting website content directly from the server hosting the content.

FIG. 1 illustrates a typical web server and client arrangement with a client requesting website content directly from the server hosting the content. A web server 100 may be configured to communicate over the Internet with one or more requesting devices 110 in order to serve requested website content to the requesting device 110. The requesting devices 110 may request the website content using any electronic communication medium, communication protocol, and computer software suitable for transmission of data over the Internet. Examples include, respectively and without limitation: a wired connection, WiFi or other wireless network, cellular network, or satellite network; Transmission Control Protocol and Internet Protocol (TCP/IP), Global System for mobile Communications (GSM) protocols, code division multiple access (CDMA) protocols, and Long Term Evolution (LTE) mobile phone protocols; and web browsers such as MICROSOFT INTERNET EXPLORER, MOZILLA FIREFOX, and APPLE SAFARI.

The web server 100 may be configured to create or modify a website that can be requested by and displayed on requesting devices 110. In some embodiments, such creation may include generating a plurality of versions of the website that convey substantially the same content but are particularly formatted to be displayed on certain requesting devices 110 or in certain browsers. For example, the web server 100 may generate a first version of the website that is formatted for PCs, and a second version of the website that is formatted for display on mobile phones. In other embodiments, such creation may include converting a website from a format that can be displayed on one type of requesting device 110 into a website that can be displayed on another type of requesting device 110. For example, the web server 100 may, upon receiving a request for the website from a mobile phone, convert the website designed to be displayed on a PC into a format that can be displayed on the mobile phone. In the present disclosure, therefore, the term website refers to any web property communicable via the Internet, such as websites, mobile websites, web pages within a larger website (e.g. profile pages on a social networking website), vertical information portals, distributed applications, and other organized data sources accessible by any device that may request data from a storage device (e.g., a client device in a client-server architecture), via a wired or wireless network connection, including, but not limited to, a desktop computer, mobile computer, telephone, or other wireless mobile device.

The web server 100 may be configured to communicate electronically with one or more data stores in order to retrieve information from the data stores. The electronic communication may be over the Internet using any suitable electronic communication medium, communication protocol, and computer software including, without limitation: a wired connection, WiFi or other wireless network, cellular network, or satellite network; Transmission Control Protocol/Internet Protocol (TCP/IP) or another open or encrypted protocol; browser software, application programming interfaces, middleware, or dedicated software programs. The electronic communication may be over another type of network, such as an intranet or virtual private network, or may be via direct wired communication interfaces or any other suitable interface for transmitting data electronically from a data store to the web server 100. In some embodiments, a data store may be a component of the web server 100, such as by being contained in a memory module or on a disk drive of the web server 100.

A data store may be any repository of information that is or can be made freely or securely accessible by the web server 100. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Each data store accessible by the web server 100 may contain information that is relevant to the creation, modification, or SEO optimization of the website, as described below. Such data stores include, without limitation to the illustrated examples: search engines 115; website information databases 120, such as domain registries, hosting service provider databases, website customer databases, and Internet aggregation databases such as archive.org; business listing data stores 125, such as YELP!, Yellow Pages, GOOGLE PLACES, LOCU, and the like; and Internet traffic databases 130 as described below.

To create or modify its website, a user may access the web server 100 with the user's device 105, which may be a PC, a mobile device, or another device able to connect electronically to the web server 100 over the Internet or another computer network. The user may be an individual, a group of individuals, a business or other organization, or any other entity that desires to publish a website that conveys information about the user or another topic, where the information may be of a commercial or a non-commercial nature. For clarity of explanation, and not to limit the implementation of the present methods, the methods are described below as being performed by a web server that receives input for creating a website for a small business, such as a restaurant or bar, retail store, or service provider (e.g. barber shop, real estate or insurance agent, repair shop, equipment renter, and the like), unless otherwise indicated.

In some embodiments, the user's device 105 may interact with a user interface 135 that facilitates data collection and transmission between the device 105 and the web server 100. The user interface 135 may be implemented using hardware, software, or a combination thereof. The user interface 135 may reside in the memory of the web server 100, of the user's device 105, or of a distinct computer server or other computing device.

In the present system, the system layout illustrated in FIG. 1 is modified to include a proxy server configured to modify the provided website content to include desired deep link URIs. By redirecting the website's traffic to the proxy server, the proxy server can automatically modify the desired target webpage with the deep link URI to provide that functionality with user intervention. The proxy server may be implemented as a computer server, or other type of device, including a processor configured to perform the methods and steps described herein.

Figure 2:
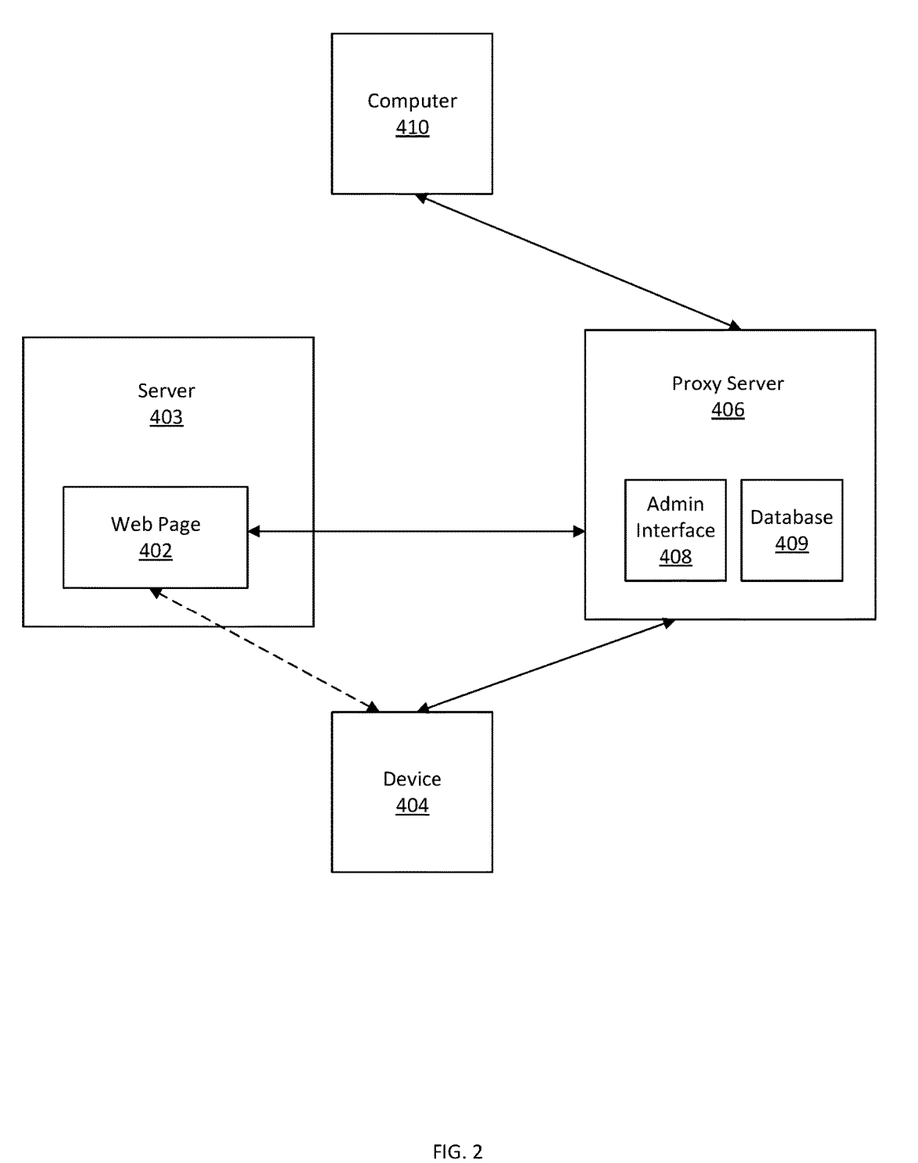
FIG. 2 is a schematic diagram of a system and associated operating environment using a DNS proxy server to implement modifications to a web page in accordance with the present disclosure.

To illustrate, FIG. 2 is a schematic diagram of a system and associated operating environment using a DNS proxy server to implement modifications to a web page in accordance with the present disclosure. With reference to FIG. 2, a user has initially created a web page 402. Web page 402 may be one web page of many that make up an entire website and is hosted on server 403. Web page 402 may have been created using any suitable method. For example, web page 402 may have been constructed by a user directly editing the code that makes up the web page 402 via a text editor. Alternatively, web page 402 may have been constructed using a WYSIWYG editing tool, or a web-based interface to facilitate the creation and revision of web page content.

At some point, however, the user may wish to insert web-associated deep link URIs into the website so that certain pages of the website, when loaded by a device having the associated application installed, will load the associated application rather than the web page or so that links embedded within the website may instead link to other applications rather than web pages. In this example, the deep link URIs will be inserted into web page 402 by proxy server 406. To make use of the proxy server 406, the user updates the DNS entry for the domain name associated with web page 402 to point to proxy server 406. The user then accesses web page 402 as normal.

Because the DNS entry has been updated, the user's computing device 404, upon attempting to retrieve the content of web page 402, communicates with proxy server 406 (see the solid arrow) rather than the server 403 hosting web page 402 directly (see the dashed arrow). Proxy server 406, upon receipt of the request from the user's computing device 404 (which includes an HTTP request identifying web page 402) is configured to retrieve the content of web page 402 from the server 403 hosting web page 402 (proxy server 406 may identify the server 403 hosting web page 402 via a lookup table or other suitable database providing information enabling proxy server 406 to identify the server hosting web page 402 and communicate with that server). Proxy server 406 then, once the content of web page 402 has been retrieved, inserts the necessary deep link URIs into the content of web page 402. This content, the combination of web page 402 with the appropriate deep link URIs, is then transmitted back to the user's computing device 404. The user's computing device can then access and implement the inserted deep link URIs, which may involve, for example, opening or otherwise executing a particular application installed on the user's computing device 404, suggesting that the user download and install a particular application onto the user's computing device 404, or, in some cases, simply displaying the requested web page 402 in a suitable browser window or frame.

When inserting the deep links into the content of web page 402, proxy server 406 may insert the deep links in accordance with user settings specified for website. The settings may be set forth, for example, by the owner or administrator for web page 402 logging into an administration user interface 408 provided by proxy server 406 or at another server. Once specified, the setting can be stored in database 409 for later utilization by proxy server 406. Database 409 may be a local database running on or accessible to proxy server 406. In still other embodiments, the settings may be stored in one or more TXT records (or other suitable record) in the DNS settings associated with the website.

In one example, web page 402 is associated with the domain name 'example.com' and has a URL of 'http://www.example.com/products/detail.php?product_id=123.'

When accessing the administration interface 408 to setup automatic deep link URI insertion of the website example.com, administration interface 408 may first prompt the user to select from a list platforms that should be supported for deep linking. Once the list is selected, administration interface 408 prompts the user to provide information necessary for the creation of deep link URIs for the selected platforms. For example, if the user selects the platform iOS, administration interface 408 may prompt the user to provide the name of the iOS application associated with the example.com domain (e.g., 'example_app'), as well as an app_store_id (allowing the application to be identified on the iOS application store). The name of the app may be equal to the name of the resource of the deep link, while the app_store_id can be used to suggest that a user whose computing device 404 does not have the application installed download and install the application. Similarly, if the user selected to ANDROID platform, administration interface 480 may prompt the user to provide the name of the Android application associated with the example.com domain, as well as an app_store_id (allowing the application to be identified on the ANDROID application store).

Once provided by the user, the settings associated with the various selected deep linking platforms can be stored within database 409.

The administration interface 408 may also prompt the user to specify how the paths of any deep links inserted into web page 402 by proxy server 406 should be constructed. In some cases, administration interface 408 may allow the user to specify a particular deep link path for a particular webpage. For example, the user may specify that the web page URL path '/info/about_us.html' always be mapped to the deep link URI path '/about_us'. As such, in this example, the web page 'http://example.com/info/about_us.html' would be associated on the iOS platform with the deep link 'example_app:///about_us.' Alternatively, the user may specify to administration interface 408 that the path of the deep link URIs should simply be the same as the paths in any inserted deep links. In that case, upon receiving a request for a particular web page 402, proxy server 406 would strip the path from the URL of the requested web page 402. That stripped path can then be appended to the name of the application provided to administration interface 408 by the user to construct an appropriate deep link URI for that web page 402.

In some embodiments, the user settings may also allow the user to specify that URLs within the web page 402 (e.g., specified within anchor tags or links to other web pages) may be modified to include or be replaced by deep link URIs where possible. In that case, if web page 402 includes an internal link to another webpage at the domain 'example.com' (e.g., http://www.example.com/about_us.html), proxy server 406 could replace that link with one or more deep link URIs so that when activated, the about us page will open in the application associated with the example.com domain. Alternatively, the user may specify that only a subset of links be replaced by deep links. For example, the user may specify that all links that include the path 'http://example.com/products/detail.php' be replaced with deep links, so that all product web pages open in the associated application.

In still other embodiments, the user may specify other deep link settings for other domain names. For example, the user could provide deep link settings for the domain name secondexample.com so that URLs that point to the domain name seocndexample.com can be replaced by corresponding deep link URIs. As such, if web page 402 includes any links to the domain secondexample.com, those links, rather than opening in a browser, could open in another application associated with the domain name secondexample.com. This option could be useful for instances in which a website owner owns multiple domain names associated with multiple applications.

Using these various settings, when web page 402 is requested, proxy server 406 can construct an appropriate set of deep link URIs for the platforms indicated by the user. Those deep link URIs can then be inserted into the content of web page 402 and the resulting modified web page 402 (now including appropriate deep link URIs) can be served up to the requesting computing device 404. As such, proxy server 406, by providing user interface 408, enables the user to specify how deep links URIs should be inserted into each of the web pages 402 making up the user's website.

Once the user has defined the settings for the deep links to be inserted into web page 402 and those setting are stored on proxy server 406 (or another suitable data storage system accessible to proxy server 406, for example, within data store 409), when web page 402 is requested in the future, proxy server 406 constructs appropriate deep link URIs based upon both the URL of web page 402 and the settings specified by the user. Those deep link URIs can then be inserted into web page 402 before serving up web page 402 to other users.

For example, if a third party wishes to view web page 402, the third party's computer 410 would request web page 402 by communicating with proxy server 406 (because the DNS records for the domain name associated with web page 402 now point to proxy server 406). In response to the user's request for a particular web page, proxy server 406 would then retrieve the content of the requested web page 402 from the server hosting web page 402. Proxy server 406 would then insert the deep link URIs according to the user's settings and transmit the revised web page 402 to the third party's computer 410.

Figure 3:
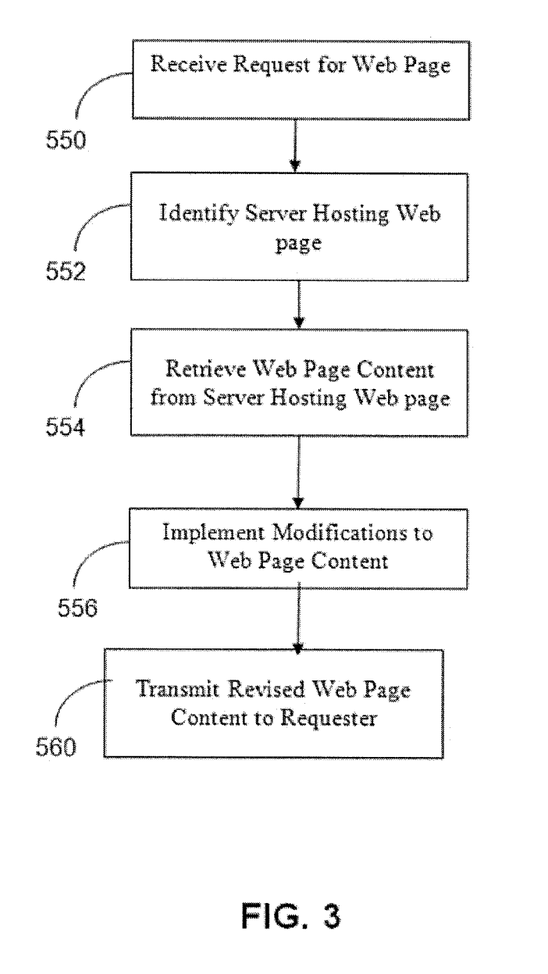
FIG. 3 illustrates a method that may be implemented by a proxy server in accordance with the present disclosure.

FIG. 3 illustrates a method that may be implemented by proxy server 406 in accordance with the present disclosure. In step 550, the proxy server receives a request for a web page. The request may include an HTTP request that identifies the web page, as well as a domain name of the web page.

In step 552, the proxy server identifies the server hosting the requested web page. This may involve the proxy server using a look up table, database, or other data source to identify an Internet Protocol (IP) address or other locating information for the server (e.g., server 403 of FIG. 2) hosting the requested web page.

In step 554, having identified the server hosting the requested web page, the proxy server retrieves the requested web page's content from that server.

In step 556, the proxy server retrieves the deep link URI settings for the domain name associated with the requested web page. In accordance with those settings, the proxy server constructs a number of deep link URIs and inserts them into the retrieved web page content. This may involve, for example, inserting the deep link URIs into the web page content, or modifying one or more URLs contained within the web page content. In step 560, the proxy server transmits the modified web page content to the requester. As such, the requester will receive, in response to his or her request, the updated web page content including the deep link URIs.

In this manner, deep link URIs can be included within the web pages of a particular website by merely requiring the revision of the website's DNS records and not the insertion of particular program code into one or more web pages of the web site. In situations in which the user's DNS host is the operated by the same entity as the user's hosting services, the change to the DNS records may be implemented automatically.

In one embodiment of the present system, the user may not even be required to update DNS records for the website in order to implement the present proxy server system for deep link URI insertion. If, for example, the proxy server (e.g., proxy server 406 of FIG. 2) is operated by the user's hosting provider and the hosting provider manages the user's DNS records for the user's website, the user may log into a domain management service with the hosting provider. Once logged in, the user may be provided with an option to implement the present proxy server methodology for the user's website.

Before causing the proxy server methodology to be implemented for the user's website, the user's website may be configured in a conventional manner. For example, with reference to FIG. 2, the user's website may be hosted on a server 403, and the DNS records for the website (managed by the hosting provider) may simply point to the server 403 so that the user's website can be directly accessed and retrieved.

Once, however, the user indicates that the proxy server methodology should be implemented for the user's website, the hosting provider could, automatically and without any input from the user, update the user's DNS records to point the domain name associated with the user's website to the proxy server (e.g., proxy server 406 of FIG. 2). At the same time, the hosting provider could store in a database record that is accessible to the proxy server an indication that the original content for the user's website is stored on a server having the IP address of server 403. By storing this record, the proxy server, upon receiving a request for one or more web pages from the user's website, can access the record to determine where the user's original website content is stored. The proxy server can then retrieve that original website content, apply modifications and deep link URI insertions to the website content, and transmit the resulting website content back to the requesting user. In the manner, in some cases the present proxy server methodology may be implemented for a website without requiring that a user modify any DNS records for their website or any other complicated changes.

Finally, the proxy server could be configured to implement caching to speed up serving of the revised web page content. In that case, the proxy server would be configured to cache versions of web page after their content has been modified to include the required deep link URIs. The proxy server can then serve those revised versions from the cache. Assuming that the proxy server is a higher performance server than the server current hosting the web page, that approach could provide additional performance benefits, too. Alternatively, the proxy server may cache the original website content on the proxy server. Then, upon receiving a request for one of the web pages of the website, the proxy server can retrieve the locally stored copy of the original website content and insert deep link URIs into the original website content before serving the revised website content up to a requester. In such a configuration, the copy of the website stored on the proxy server could be stored permanently so that even if the original website content is taken down, or the server hosting the original website content should become unavailable or be hosted at a new IP address, the proxy server will still have access a copy of the original website content.

In some alternative embodiments, deep linking methodologies may be implemented for web pages without modifying the underlying HTML or other source code for the web page. In that case, rather than insert specific deep link URIs into the web pages of the website, entries may be established in the DNS settings for the website, where the settings govern how deep links can be established for one or more of the web pages on the website.

This approach uses domain TXT records to map web page URLs directly to deep link URIs. Such an approach could require a number of TXT fields that link a domain to a particular deep linking scheme on a number of mobile platforms. For example, the following TXT entries could be used to established deep link URIs for web pages within the domain example.com to two mobile applications running on, for example, iOS and Android mobile device operating system. The TXT entries may also specify additional information that can be used to point a user to an app store should the app not be installed.

TXT gd:ios:scheme=example
TXT gd:ios:app_store_id=12345
TXT gd:ios:app_name=Example
TXT gd:play:scheme=example_app
TXT gd:play:app_store_id=12345
TXT gd:play:app_name=Example Under this proposed standard, only a single domain name can be associated with deep links for a single application. Additionally, applications may require a 1:1 mapping of web page URLs to deep link URI paths, since the deep link is established by the DNS entry only at the domain level.

Such an approach could also permit application developers to use trusted deep links without hosting web pages containing markup or relying on other services to implement deep links.

In implementations in which a developer wishes to publish multiple applications but has just a single domain, subdomains can be used to add additional granularity.

Figure 4:
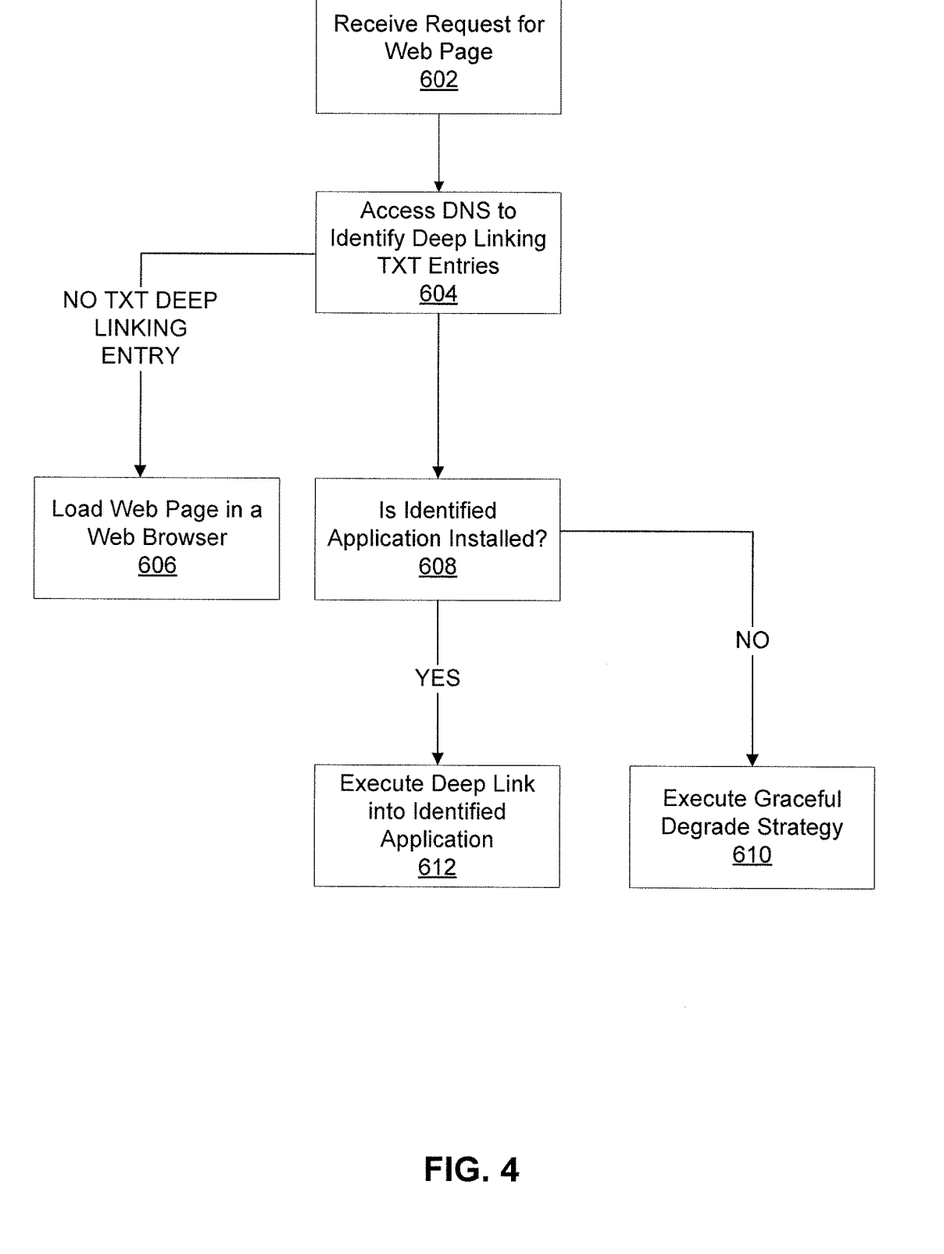
FIG. 4 is a flowchart illustrating a method for implementing web-associated deep link URI insertion for a website using settings stored in a DNS record.

FIG. 4 is a flowchart illustrating a method for implementing web-associated deep link URI insertion for a website using settings stored in a DNS TXT record. In one example, the method may be implemented by a web browser or other application running on a mobile device. In step 602, a request for a web page is received (e.g., by the browser or application). After receiving the web page request, in step 604 a DNS record for the domain name that is associated with the web page is retrieved to determine whether the record includes TXT records or settings specifying how deep links are to be created for the website. This may involve, for example, the mobile application identifying a TXT record that specifies particular deep linking settings associated with the operating system of the mobile device. For example, if the method is being implemented by an application running on iOS, records that specify a scheme, app_store_id, and app_name for iOS may be retrieved.

If there are no deep linking DNS records for the operating system of the mobile device, the method may move to step 606 and the requested web page may be loaded within a browser application running on the mobile device.

Alternatively, however, if deep linking DNS records are present for the operating system of the mobile device, in step 608 a determination is made as to whether the application identified in the DNS record (e.g., by the text record identifying a 'scheme' or 'app_name') is installed on the mobile device. If not, the method moves to step 610, which calls for the method to execute a graceful degradation. That may involve, for example, the application simply opening the requested web page in a web browser installed on the mobile device, or in a browser implemented within a display frame of the application executing the method. Alternatively, step 610 may involve the application directing a user to a web site or application store enabling the user to download the application identified in the DNS record. This may involve, for example, using the app_store_id value in the DNS record to identify the application with the application store. The approach executed in step 610 may be specified in a setting stored, for example, in the DNS record for the domain name associated with the web page being requested.

If, however, in step 608 it is determined that the application is installed on the mobile device, in step 612 a deep linking URI is constructed and the specified application is launch with the URI being an input to the application. The construction of the deep link URI may involve using the information retrieved from the DNS record in conjunction with at least a portion of the URL of the web page being requested to construct the deep linking URI. For example, if the web page being requested is http://www.example.com/products/detail.php?product_id=123 and the TXT record specifying a schema in the DNS record for the domain name example.com is ' TXT gd:ios:scheme=example', the deep linking URI may be set to 'example///products/detail.php?product_id=123.' As such, this approach involves constructing the URI by concatenating the schema with the portion of the URL of the requested web page that follows the domain name.

Once constructed, the deep link URI can be executed, which will call the application 'example' to be executed with an input string of '/products/detail.php?product_id=123.' The example application can use the input string to display a particular user interface of the example application, where the state of the user interface (e.g., the content that is displayed) is at least partially determined by the input string.

Because the DNS can be relatively lightweight and fast, querying these TXT records can be significantly faster than querying web pages in search of linking markup. This approach, therefore, may not require a separate link-resolution service as DNS queries would be sufficient to construct the deep links. Additionally, since DNS records can be cached locally using existing DNS time-to-live (TTL) rules, it may be relatively straightforward to create deep link web associations that can be cached on a mobile device enabling a large percentage of web-associated deep links that can open without a web request (or even Internet connectivity).

In some embodiments, deep linking URIs may be utilized to connect a customer's website with a mobile application that, for example, provides an online store functionality. Such an application could share the same product content and the same theme as the website-based version of the customer's store. In one implementation, the application may be created, reviewed and submitted to multiple app stores without the involvement of the customer, using readily available tools. Then it would be possible to automatically insert deep links into the customer's website that reference the store application. With the deep links installed in the customer's website, the customer would automatically have an application created and preconfigured for deep links to all of their products and landing pages for optimized conversion and application SEO.

Since many users (particularly those operating smaller companies) may likely find it difficult to get their own customers to install such an app, it may be possible to pool multiple online stores that each contain deep links into a single umbrella store application. In this way, it may be possible to maximize the probability that a particular end user has the store application installed, enabling the deep links to function reliably.

In one embodiment, a system includes a first computer server hosting a plurality of web pages of a website, a data storage server configured to store deep link settings for the website, and a proxy server in communication with the data storage server. The proxy server is configured to receive, via a communications network, a request from a computing device of a user for a first web page of the website, retrieve a content of the first web page from the first computer server, retrieve a deep link setting for the first web page of the website from the data storage server, and insert a uniform resource indicator into the first web page to create a modified content of the first web page. The uniform resource indicator includes the deep link setting and, when executed by the computing device of the user, the uniform resource indicator causes the computing device to load an application identified by the uniform resource indicator. The proxy server is configured to transmit the modified content of the first web page to the computing device of the user. The system includes a domain name system (DNS) server storing a DNS record associating a domain name of the website with an Internet protocol (IP) address of the proxy server.

In another embodiment, a proxy server includes a processor configured to execute program code configured to cause the proxy server to receive, via a communications network, a request from a computing device of a user for a first web page of a website, retrieve a content of the first web page from a first computer server via a communications network, retrieve a deep link setting for the first web page of the website from a data storage server, insert a uniform resource indicator into the first web page to create a modified content of the first web page, the uniform resource indicator including the deep link setting and, when executed by the computing device of the user, the uniform resource indicator causes the computing device to load an application identified by the uniform resource indicator, and transmit the modified content of the first web page to the computing device of the user.

In another embodiment, a method includes receiving, via a communications network, a request from a computing device of a user for a first web page of a website, retrieving a content of the first web page from a first computer server via a communications network, and retrieving a deep link setting for the first web page of the website from a data storage server. The method includes inserting a uniform resource indicator into the first web page to create a modified content of the first web page. The uniform resource indicator includes the deep link setting and, when executed by the computing device of the user, the uniform resource indicator causes the computing device to load an application identified by the uniform resource indicator. The method includes transmitting the modified content of the first web page to the computing device of the user.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

We claim:
1. A system, comprising:
a first computer server including at least one hardware processor and hosting a plurality of web pages of a website;
a data storage server including at least one hardware processor and configured to store deep link settings for the website;
a proxy server in communication with the data storage server, the proxy server including at least one hardware processor and being configured to:
receive, via a communications network, a request from a computing device of a user for a first web page of the website,
retrieve a content of the first web page from the first computer server,
retrieve a deep link setting for the first web page of the website from the data storage server,
use the deep link setting to construct a uniform resource indicator including the deep link setting,
modify a hypertext markup language code associated with the first web page to insert the uniform resource indicator into the first web page to create a modified content of the first web page, the uniform resource indicator including the deep link setting and, when executed by the computing device of the user, the uniform resource indicator causes the computing device to load an application identified by the uniform resource indicator, and
transmit the modified content of the first web page to the computing device of the user; and a domain name system (DNS) server storing a DNS record associating a domain name of the website with an Internet protocol (IP) address of the proxy server.

2. The system of claim 1, wherein the uniform resource indicator includes at least a portion of a uniform resource locator identifying the first web page of the website.

3. The system of claim 2, wherein the proxy server is configured to create the uniform resource indicator by appending the at least a portion of a uniform resource locator to the deep link setting.

4. The system of claim 1, wherein the deep link setting identifies a mobile application.

5. The system of claim 1, wherein the deep link setting identifies a first mobile application associated with a first operating system and a second mobile application associated with a second operating system.

6. The system of claim 5, wherein the deep link setting is encoded into a DNS record associated with the website.

7. The system of claim 6, wherein the deep link setting is encoded into a DNS TXT record.

8. The system of claim 5, wherein the DNS record is stored in the DNS server.

* * * * *